(12) United States Patent
Varadarajan et al.

(10) Patent No.: US 9,444,627 B2
(45) Date of Patent: Sep. 13, 2016

(54) SYSTEM AND METHOD FOR PROVIDING GLOBAL PLATFORM COMPLIANT TRUSTED EXECUTION ENVIRONMENT

(71) Applicant: INTEL CORPORATION, Santa Clara, CA (US)

(72) Inventors: Srikanth Varadarajan, Hillsboro, OR (US); Reshma Lal, Hillsboro, OR (US); Krystof C. Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,980

(22) Filed: Dec. 24, 2014

(65) Prior Publication Data
US 2016/0191246 A1 Jun. 30, 2016

(51) Int. Cl.
| | |
|---|---|
| *H04L 29/06* | (2006.01) |
| *H04L 9/32* | (2006.01) |
| *G06F 9/54* | (2006.01) |
| *G06F 9/48* | (2006.01) |
| *G06F 9/44* | (2006.01) |
| *G06F 9/455* | (2006.01) |

(52) U.S. Cl.
CPC .......... *H04L 9/3234* (2013.01); *G06F 9/4406* (2013.01); *G06F 9/45533* (2013.01); *G06F 9/4843* (2013.01); *G06F 9/54* (2013.01)

(58) Field of Classification Search
CPC ...................................................... G06F 21/74
See application file for complete search history.

(56) References Cited

U.S. PATENT DOCUMENTS

2014/0317686 A1* 10/2014 Vetillard ................. G06F 21/74
  726/2
2015/0270960 A1* 9/2015 Ponsini .................... G06F 21/62
  713/189

\* cited by examiner

*Primary Examiner* — Jason K Gee
(74) *Attorney, Agent, or Firm* — Blakely, Sokoloff, Taylor & Zafman LLP (57) ABSTRACT

Method of providing a Global Platform (GP) compliant Trusted Execution Environment (TEE) starts with main processor executing an application stored in memory device. Application includes client application (CA) and trusted application (TA). Executing the application includes running CA in client process and TA in TEE host process. Client process and TEE host process are separate. Using TEE host process, a request including identifier of the TA is received from client process to open session. Using GP Trusted Services enclave included in TEE host process, TA enclave associated with the identifier is determined and loaded in the TEE host process using the GP Trusted Services enclave to establish the session. Using TEE host process, commands to be invoked in TA enclave and set of parameters needed for commands are received from client process. Using GP Internal APIs, commands in TA enclave associated with identifier are executed. Other embodiments are also described.

22 Claims, 5 Drawing Sheets

… … In one embodiment, a microphone port and speaker ports included in the system 10 may be coupled to the communications circuitry to enable the user to participate in wireless telephone or video calls. A variety of different wireless communications networks and protocols may be supported in the wireless communications devices. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling.

SYSTEM AND METHOD FOR PROVIDING GLOBAL PLATFORM COMPLIANT TRUSTED EXECUTION ENVIRONMENT

FIELD

An embodiment of the invention relate generally to a system and a method for providing global platform compliant trusted execution environment (TEE).

BACKGROUND

Global Platform (GP) is an industry wide association that publishes specifications for secure deployment and management of applications. Trusted Execution Environment (TEE) is a specification defined by GP that provides a secure environment for storing and processing sensitive information. TEE specification helps Original Equipment Manufacturers (OEMs) and Independent Software Vendors (ISVs) in creating and deploying sensitive applications such as secure transactions, digital rights management, Near-Field Communication (NFC) payments etc.

In order to provide GP TEE support on platforms, the two current methods include (i) a Virtual Memory Manager (VMM) based approach and (ii) an implementation of the TEE entirely within a security processor. The first approach has the disadvantage of creating a larger attack surface for exploitation since the entire VMM is included in the Trusted Code Base (TCB) and the trusted applications do not have isolation. The second approach is resource constrained such that it has the disadvantage of having limited scalability.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
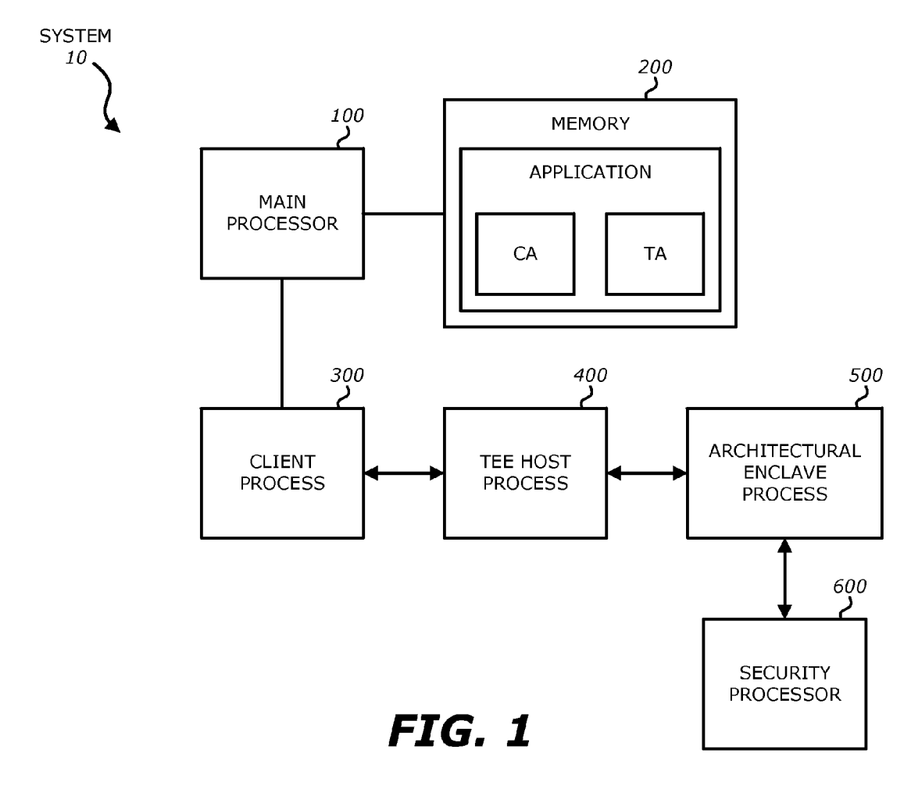
FIG. 1 illustrates a block diagram of a system for providing GP compliant TEE according to one embodiment of the invention.

FIG. 1 illustrates a block diagram of a system 10 for providing GP compliant TEE according to one embodiment of the invention. System 10 may be a mobile telephone communications device or a Smartphone. However, the system 10 may also be, for instance, desktop computer, laptop computer, a tablet computer, a notebook computer, or a wearable computer. System 10 may also include a communication interface that includes wireless communications devices having communications circuitry such as radio frequency (RF) transceiver circuitry, antennas, etc. . . . . . In one embodiment, a microphone port and speaker ports included in the system 10 may be coupled to the communications circuitry to enable the user to participate in wireless telephone or video calls. A variety of different wireless communications networks and protocols may be supported in the wireless communications devices. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling.

Figure 2:
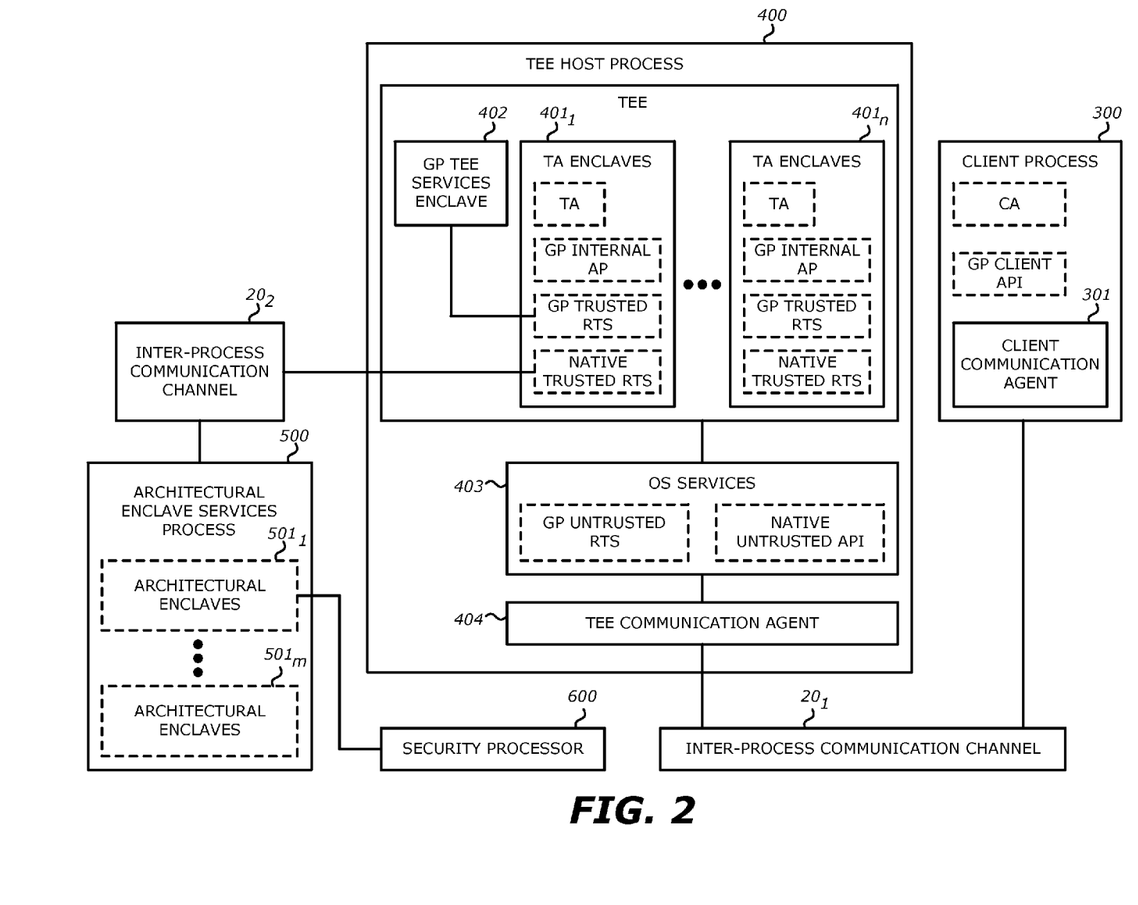
FIG. 2 illustrates a block diagram of the details of the system for providing GP compliant TEE in FIG. 1 according to one embodiment of the invention.

As shown in FIG. 1, system 10 includes a main processor 100, a memory device 200, and a security processor 600. Main processor 100 may include a processor, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. Main processor 100 may be used to control the operations of system 10 by executing software instructions or code stored in the memory device 200. Memory 200 may include one or more different types of storage such as hard disk drive storage, nonvolatile memory, and volatile memory such as dynamic random access memory. In some cases, a particular function as described below may be implemented as two or more pieces of software in the memory 200 that are being executed by different hardware units of a main processor 100. In one embodiment, main processor 100 is coupled to memory device 200 to execute an application stored in memory device 200. The application includes a client application (CA) and a trusted application (TA). In one embodiment, when main processor 100 executes the application, main processor 100 runs CA in a client process 300 and the TA in a TEE host process 400. Main processor 100 may also be coupled to memory device 200 to run an architectural enclave services (AES) process 500. As shown in FIG. 2, the client process 300, the TEE host process 400, and the AES process 500 may be separate.

The CA is a software application that invokes the TAs. The CA does not include any sensitive code and data requiring protection. For instance, the CA may be an ISV application that invokes trusted service. In contrast, the TA is a software application that includes sensitive code and data that must be protected. The TAs are instantiated when a CA invokes the TAs. In this architecture, the TAs are isolated from the rest of the system running within the TEE. The type of isolation may be provided by a mode switch of main processor 100 (e.g., CPU). In one embodiment, the method of implementing GP TEE uses features of main processor 100 that provides a secure execution environment for application writers to store and process sensitive data within the main Operating System (OS) (e.g., Intel® Software Guard Extensions (SGX)) and the security processor 600 (e.g., Intel® Converged Security Engine (CSE)) that provides access to secure services on the platform such as trusted time and trusted monotonic counters. In this embodiment, no changes are required to be made to the CA. In one embodiment, the client process 300, the TEE host process 400, and the AES process 500 are running in main processor 100 (e.g., host CPU) but the feature of main processor 100 that provides the secure execution environment (e.g., TEE) such as the SGX is being used to isolate the TAs.

FIG. 2 illustrates a block diagram of the details of the system 10 according to one embodiment of the invention. As shown in FIG. 2, the main processor 100 executes the application by running the CA in client process 300 and the TA in the TEE host process 400. Client process 300 is a process that hosts the CA that does not include any security requirements. As shown in the FIG. 2, client process 300 includes the CA, GP Client Application Programming Interfaces (APIs), and a client communication agent 301. GP Client APIs are GP defined client APIs that may be modified to communicate with the TEE host process 400. In one embodiment, GP Client APIs may include TEE client APIs, which are a set of programming interface used by CAs to establish communication with a corresponding TA and invoke secure operations within the TA. Client communication agent 301 may support inter-process communication to the TEE host process 400.

Referring to FIG. 2, TEE host process 400 is the process that is separate from client process 300 that hosts the TAs and other trusted services. Each of the TAs and other trusted services run in a separate enclave. TEE host process 400 also provides communication methods to interface with other components such as the OS, CAs and Architectural Enclaves (AEs) such as Platform Services Enclaves (PSEs). TEE host process 400 includes a plurality of TA enclaves $401_1$-$401_n$ (n>1), GP TEE services enclave 402, OS services 403, and TEE communication agent 404. TA enclaves $401_1$-$401_n$ and GP TEE services enclave 402 are included in the TEE.

Each TA application runs in a separate TA enclave $401_1$-$401_n$. When a CA invokes a TA, TEE host process 400 launches the TA enclave that was invoked. GP TEE services enclave 402 (e.g., GP trusted services enclave) provides trusted services for TAs that include, for example, invocation and lifecycle management of TA enclaves, secure TA to TA communication, and book-keeping individual TAs information such as secure store management. As discussed above, the isolation of TA enclaves $401_1$-$401_n$ may be implemented using the feature of main processor 100 that provides the secure execution environment (e.g., SGX). Each TA enclave $401_1$-$401_n$ may include GP internal APIs, GP trusted Runtime System (RTS), and Native trusted RTS. The GP internal APIs may include TEE Internal APIs, which are a set of programming interface that is used by TAs for secure services defined in the GP specification. The TEE Internal APIs include, for example, APIs for access to cryptography, time, arithmetic, storage, and user interface (UI) services. GP trusted RTS is a static library that provides implementation of Internal APIs for trusted applications. For instance, the GP trusted RTS may include trusted libraries for access to cryptography, memory manager and storage. The native trusted RTS may be for example the native SGX trusted RTS. In this embodiment, a higher level of security is achieved since (i) each TA runs within its own TA enclave $401_1$-$401_n$, which have main processor-based protection, (ii) the trusted services are also encapsulated within the TA enclaves $401_1$-$401_n$ or derived from the security processor 600, and (iii) there are no OS or kennel services inside the Trusted Code Base (TCB) which reduces the attack surface.

OS services 403 are not protected and provide support libraries and services. OS services 403 may include untrusted infrastructure services including threading, synchronization, command queue handling and GP untrusted Runtime System (RTS). OS services 403 may also include Native untrusted RTS such as the Native SGX untrusted RTS.

Figure 3:
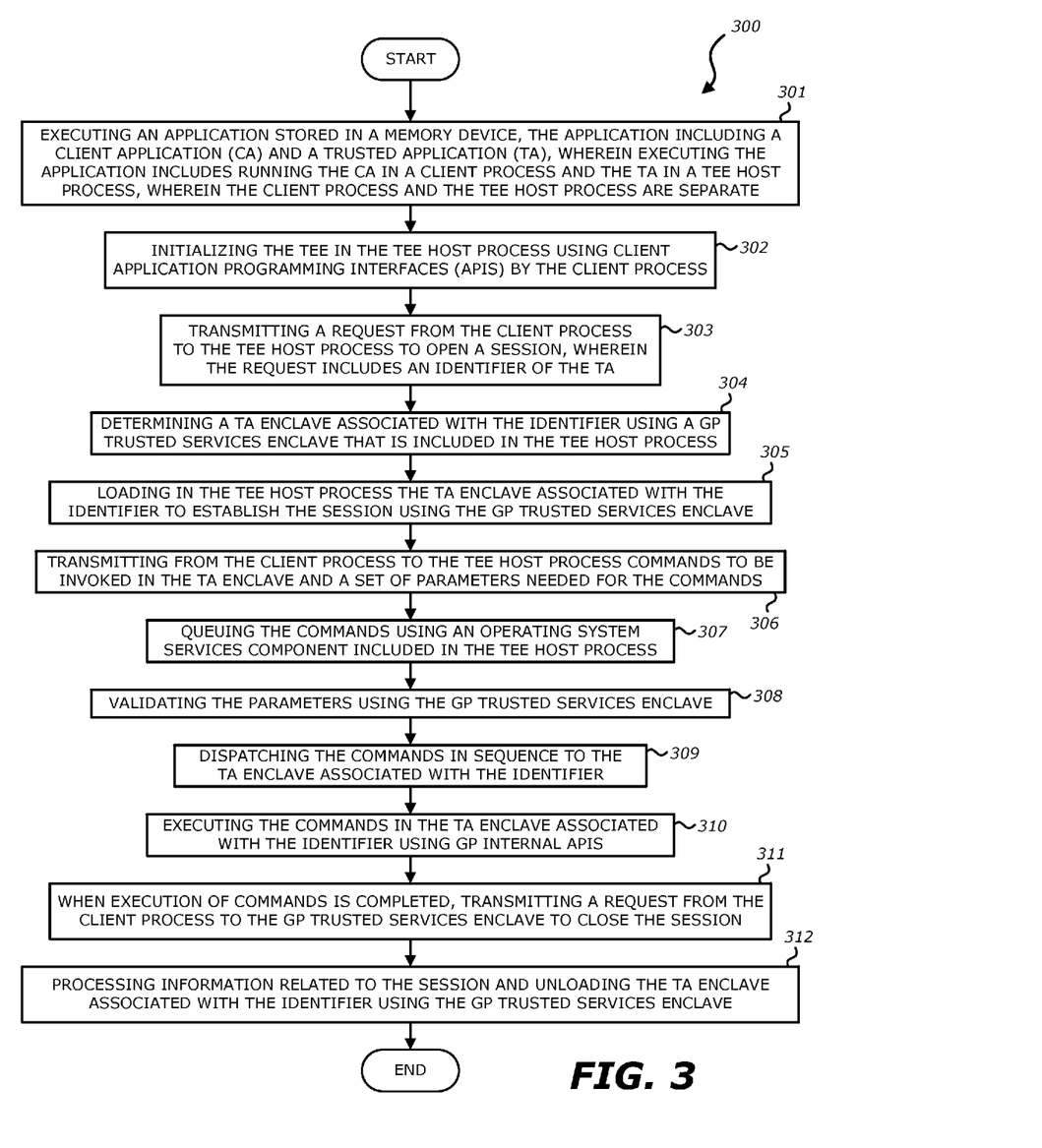
FIG. 3 illustrates a flow diagram of an example method for providing GP compliant TEE according to an embodiment of the invention.

TEE communication agent 404 supports the inter-process communication to the CA process 300. As shown in FIG. 3, the client communication agent 301 and the TEE communication agent 404 may communicate via an inter-process communication (IPC) channel $20_1$. Accordingly, the IPC channel $20_1$ provides a communication channel between client process 300 and TEE host process 400.

Similarly, an IPC channel $20_2$ provides a communication channel between TEE host process 400 and AES process 500. AES process 500 includes a plurality of architectural enclaves (AEs) $501_1$-$501_m$ (m>1) such as PSEs that provide secure services such as time, monotonic counters, and trusted input-output (I/O) to implement the GP internal APIs in the TA enclaves $401_1$-$401_n$. Architectural enclaves $501_1$-$501_m$ may use underlying hardware such as the security processor 600. In one embodiment, PSE and architectural enclaves $501_1$-$501_m$ provides secure services to TAs.

In some embodiments, security processor 600 may be a security co-processor such as CSE that provides trusted services using hardware isolation. Examples of trusted services include trusted time and trusted user interface (TUI). In some embodiments, other secure platform components such as NFC may be used to provide trusted services to the TEE host process 400.

With regards to benefits, the system 10 provide strong remote attestation capability since the main processor 100 feature that provides secure execution environment (e.g., SGX) may provide hardware-based attestation of enclave software to an off-platform entity. The system 10 is also scalable since the GP TEE runs on the main processor 100 and as such the TEE host process 400 has access to all the platform resources. The system 10 also provides cost benefits for OEMs and ISVs for deploying new TAs since the system 10 does not require firmware upgrade. Further, system 10 provides improved system responsiveness since there is no co-processor offload of secure operations such that the latency of the system is reduced.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

FIG. 3 illustrates a flow diagram of an example method 300 for providing GP compliant TEE according to an embodiment of the invention. The method 300 starts with the main processor 100 executing an application stored in the memory device 200 (Block 301). The application includes a client application (CA) and a trusted application (TA). Executing the application includes running the CA in a client process 300 and the TA in a TEE host process 400. The client process 300 and the TEE host process 400 are separate. At Block 302, the client process 300 uses the client APIs to initialize the TEE in the TEE host process 400. At Block 303, the client process 300 transmits a request to the TEE host process 400 to open a session. The request may include an identifier of a specific TA. In some embodiments, the identifier is a Unique Universal Identifier (UUID) of the TA. The request may be sent via the IPC mechanism. At Block 304, the GP Trusted Services enclave 402 receives the request and determines a TA enclave associated with the identifier. The GP trusted services enclave 402 is included in the TEE host process 400. At Block 305, the GP trusted services enclave 402 loads in the TEE host process 400 the TA enclave $401_n$ associated with the identifier to establish the session. In one embodiment, when the TA enclave $401_n$ associated with the identifier is previously loaded, the GP trusted services enclave 402 selects the TA enclave $401_n$ associated with the identifier. At Block 306, once the session is established, the client process 300 transmits to the TEE host process 400 commands to be invoked in the TA enclave $401_n$ and a set of parameters needed for the commands. The commands and the set of parameters may be transmitted via an IPC channel (e.g., IPC channel $20_1$). At Block 307, the OS services 403 included in the TEE host process 400 queues the commands and at Block 308, GP trusted services enclave 402 validates the parameters. In one embodiment, the parameters are untrusted. After validation, at Block 309, the commands are dispatched in sequence to the TA enclave $401_n$ associated with the identifier from the OS services 403.

Figure 4A:
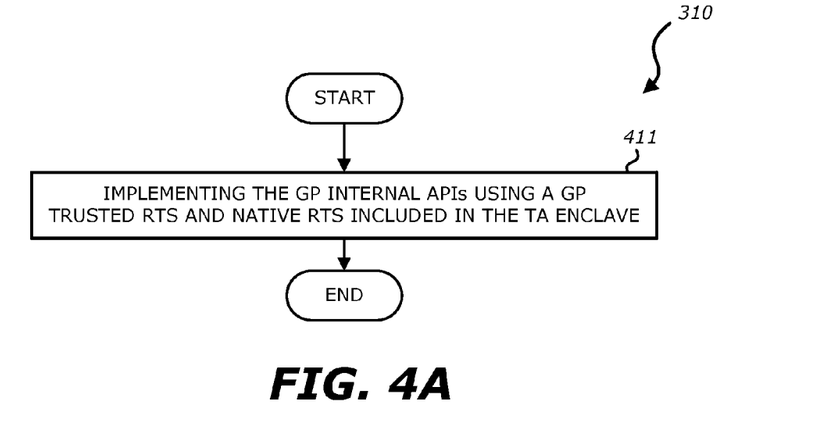
FIGS. 4A-4B illustrate flow diagrams of methods for executing the commands in the TA enclave in Block 310 in FIG. 3 according to embodiments of the invention.
Figure 4B:
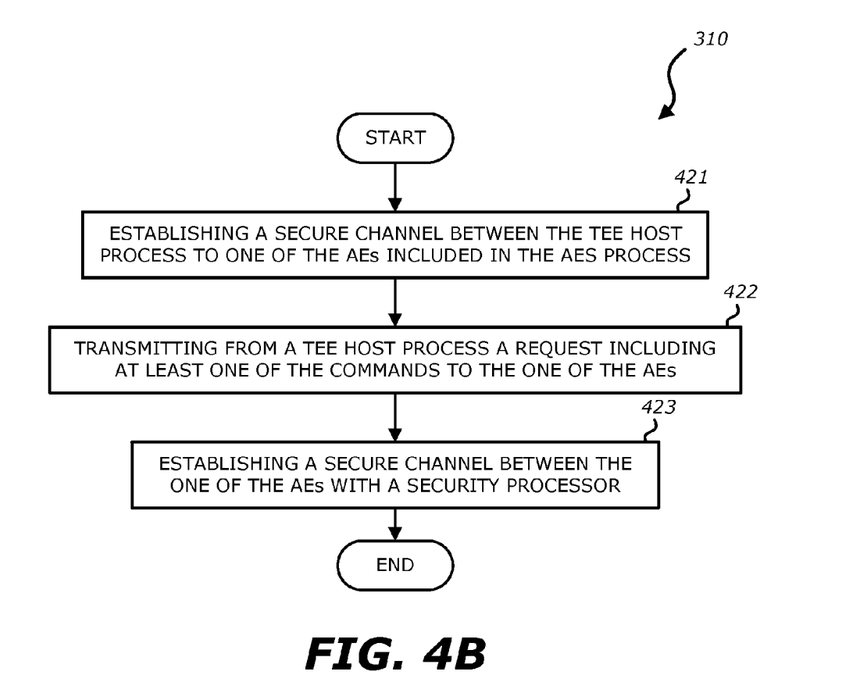

At Block 310, the commands are executed in the TA enclave $401_n$ associated with the identifier using GP internal APIs. Referring to FIGS. 4A-4B, flow diagrams of methods for executing the commands in the TA enclave $401_n$ in Block 310 in FIG. 3 according to embodiments of the invention. In FIG. 4A, executing the commands in the TA enclave $401_n$ includes implementing the GP Internal APIs using a GP trusted RTS and native trusted RTS included in the TA enclave $401_n$ (Block 411). For example, for services provided internally using SGX runtime system (e.g., crypto, secure storage, memory management services), the TA enclave $401_n$ wanting to utilize crypto operations, for instance, calls the GP internal crypto APIs defined in the TEE specification and the GP trusted RTS, in turn, utilizes the existing crypto capability such as AES in the SGX RTS.

In one embodiment, the main processor 100 further runs an AES process that includes a plurality of AEs that provide secure services, respectively. For example, services provided such as accessing secure time, replay protection using monotonic counters, etc. The AES process is separate from the client process and the TEE host process. In the embodiment in FIG. 4B, executing the commands in the TA enclave $401_n$ includes establishing a secure channel (e.g., IPC channel $20_2$) between the TEE host process 400 to one of the AEs $501_m$ included in the AES process 500 (Block 421). At Block 422, the TEE host process 400 transmits a request including at least one of the commands to the one of the AEs $501_m$ and at Block 423, a secure channel is established between the one of the AEs $501_m$ with a security processor 600. For example, the TA wanting to utilize secure time would call the internal time APIs defined in the TEE specification. Since the secure time services is provided by external architectural enclave $501_m$, the SGX RTS first establishes a secure channel to route the request outside the TEE host process 400. After connecting through the secure channel (e.g., IPC channel $20_2$), AE $501_m$ acknowledges the request and provides the secure time service. The AE $501_m$, in turn, establishes a secure channel with the security processor 600 (e.g., CSE) to provide secure time utilizing the hardware clock.

At Block 311, when execution of commands is completed, the client process 300 transmits a request to the GP trusted services enclave 402 to close the session and at Block 312, the GP trusted services enclave 402 processes information related to the session and unloads the TA enclave $401_n$ associated with the identifier. In one embodiment, the GP trusted services enclave 402 processes information related to the session includes locating and removing all session specific information.

In the embodiment in FIG. 3, the method 300 is a multi-process approach complying with the GP TEE specification that is scalable. The CA and the TA run their own processes and communicate with each other through standard OS-provided IPC mechanisms. By running the CA and TA in separate processes enables complying with all scenarios of to instantiations as described in the TEE specification.

Figure 5:
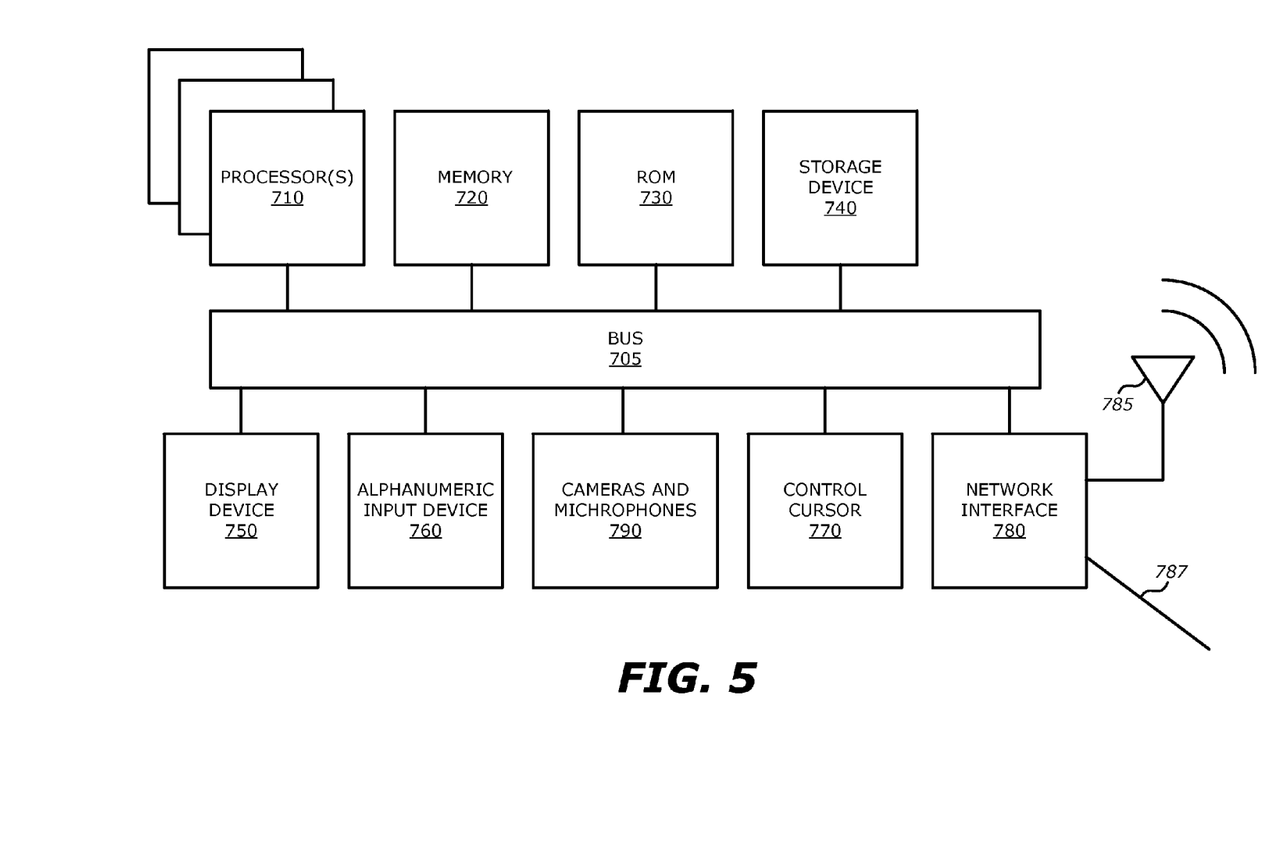
FIG. 5 illustrates computer system suitable for implementing embodiments of the present disclosure.

FIG. 5 illustrates a diagrammatic representation of a computing system 700, such as system 10. Computing system 700 includes bus 705 (or, for example, a link, an interconnect, or another type of communication device or interface to communicate information) and processor 710 coupled to bus 705 that may process information. While computing system 700 is illustrated with a single processor, electronic system 700 and may include multiple processors and/or co-processors, such as one or more of central processors, graphics processors, and physics processors, etc. Computing system 700 may further include random access memory (RAM) or other dynamic storage device 720 (referred to as main memory), coupled to bus 705 and may store information and instructions that may be executed by processor 710. Main memory 720 may also be used to store temporary variables or other intermediate information during execution of instructions by processor 510.

Computing system 700 may also include read only memory (ROM) and/or other storage device 730 coupled to bus 705 that may store static information and instructions for processor 710. Date storage device 740 may be coupled to bus 705 to store information and instructions. Date storage device 740, such as magnetic disk or optical disc and corresponding drive may be coupled to computing system 700.

Computing system 700 may also be coupled via bus 705 to display device 750, such as a cathode ray tube (CRT), liquid crystal display (LCD) or Organic Light Emitting Diode (OLED) array, to display information to a user. User input device 760, including alphanumeric and other keys, may be coupled to bus 705 to communicate information and command selections to processor 710. Another type of user input device 760 is cursor control 770, such as a mouse, a trackball, a touchscreen, a touchpad, or cursor direction keys to communicate direction information and command selections to processor 710 and to control cursor movement on display 750. Camera and microphone arrays 790 of computer system 700 may be coupled to bus 705 to observe gestures, record audio and video and to receive and transmit visual and audio commands.

Computing system 700 may further include network interface(s) 780 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 785, which may represent one or more antenna(e). Network interface(s) 780 may also include, for example, a wired network interface to communicate with remote devices via network cable 787, which may be, for example, an Ethernet cable, a coaxial cable, a fiber optic cable, a serial cable, or a parallel cable.

Network interface(s) 780 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 780 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 780 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 700 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a computer-readable storage medium having stored therein instructions that, when executed by a processor, causes the processor to perform a method of providing a Global Platform (GP) compliant Trusted Execution Environment (TEE) comprising: executing an application stored in a memory device, the application including a client application (CA) and a trusted application (TA), wherein executing the application includes running the CA in a client process and the TA in a TEE host process, the client process and the TEE host process being separate; receiving using the TEE host process a request from the client process to open a session, wherein the request includes an identifier of the TA; determining a TA enclave associated with the identifier using a GP Trusted Services enclave that is included in the TEE host process; loading in the TEE host process the TA enclave associated with the identifier to establish the session using the GP Trusted Services enclave; receiving using the TEE host process commands to be invoked in the TA enclave and a set of parameters needed for the commands, wherein the commands and the set of parameters are from the client process; and executing the commands in the TA enclave associated with the identifier using GP Internal APIs.

Example 2 includes the subject matter of Example 1, wherein executing the commands in the TA enclave associated with the identifier using GP Internal APIs further comprises: implementing the GP Internal APIs using a GP trusted Run Time System (RTS) and native trusted RTS included in the TA enclave.

Example 3 includes the subject matter of Example 1, further comprising: running an Architectural Enclave Services (AES) process that includes a plurality of Architectural Enclaves (AEs) that provide secure services, respectively, wherein the AES process is separate from the client process and the TEE host process.

Example 4 includes the subject matter of Example 1, wherein executing the commands in the TA enclave associated with the identifier using GP Internal APIs further comprises: establishing a secure channel between the TEE host process to one of the AEs included in the AES process; transmitting a request including at least one of the commands to the one of the AEs; and establishing a secure channel between the one of the AEs with a security processor.

Example 5 includes the subject matter of Example 1, further comprising: initializing the TEE in the TEE host process using Client application programming interfaces (APIs) by the client process.

Example 6 includes the subject matter of Example 1, further comprising: queuing the commands using an operating system services component included in the TEE host process; validating the parameters using the GP Trusted Services enclave; and dispatching the commands in sequence to the TA enclave associated with the identifier.

Example 7 includes the subject matter of Example 1, further comprising: when execution of commands is completed, transmitting a request from the client process to the GP Trusted Services enclave to close the session; and processing information related to the session and unloading the TA enclave associated with the identifier using the GP Trusted Services enclave to close the session.

Example 8 includes the subject matter of Example 1, wherein the identifier of the TA is a Unique Universal Identifier (UUID).

Example 9 includes the subject matter of Example 1, wherein the request to open the session, process commands and the set of parameters are transmitted via an Inter-process communication (IPC) channel.

Example 10 includes the subject matter of Example 1, further comprising: when the TA enclave associated with the identifier is previously loaded, selecting using the GP Trusted Services Enclave the TA enclave associated with the identifier.

Example 11 includes the subject matter of Example 1, wherein the TEE host process includes the TEE, wherein the TEE includes a plurality of TA enclaves including the TA enclave associated with the identifier and the GP Trusted Services enclave.

Some embodiments pertain to Example 12 that pertains to a method of providing a Global Platform (GP) compliant Trusted Execution Environment (TEE) comprising: executing by a processor an application stored in a memory device, the application including a client application (CA) and a trusted application (TA), wherein executing the application includes running the CA in a client process and the TA in a TEE host process, the client process and the TEE host process being separate; receiving by the processor using the TEE host process a request from the client process to open a session, wherein the request includes an identifier of the TA; determining by the processor a TA enclave associated with the identifier using a GP Trusted Services enclave that is included in the TEE host process; loading by the processor in the TEE host process the TA enclave associated with the identifier to establish the session using the GP Trusted Services enclave; receiving by the processor using the TEE host process commands to be invoked in the TA enclave and a set of parameters needed for the commands, wherein the commands and the set of parameters are from the client process; validating by the processor the parameters using the GP Trusted Services enclave; dispatching by the processor the commands in sequence to the TA enclave associated with the identifier; executing by the processor the commands in the TA enclave associated with the identifier using GP Internal APIs; and processing by the processor information related to the session and unloading the TA enclave associated with the identifier using the GP Trusted Services enclave to close the session.

Example 13 includes the subject matter of Example 12, wherein executing by the processor the commands in the TA enclave associated with the identifier using GP Internal APIs further comprises: implementing the GP Internal APIs using a GP trusted Run Time System (RTS) and native trusted RTS included in the TA enclave.

Example 14 includes the subject matter of Example 12, further comprising: running by the processor an Architectural Enclave Services (AES) process that includes a plurality of Architectural Enclaves (AEs) that provide secure services, respectively, wherein the AES process is separate from the client process and the TEE host process.

Example 15 includes the subject matter of Example 14, wherein executing the commands in the TA enclave associated with the identifier using GP Internal APIs further comprises: establishing a secure channel between the TEE host process to one of the AEs included in the AES process; transmitting a request including at least one of the commands to the one of the AEs; and establishing a secure channel between the one of the AEs with a security processor.

Some embodiments pertain to Example 16 that pertains to a system providing a Global Platform (GP) compliant Trusted Execution Environment (TEE) comprising: a memory device to store an application, the application including a client application (CA) and a trusted application (TA); a processor coupled to the memory device to execute the application by running the CA in a client process and the TA in a TEE host process, to run an Architectural Enclave Services (AES) process that includes a plurality of Architectural Enclaves (AEs) that provide secure services, respectively, wherein the client process, the TEE host process, and the AES process are separate, to signal to the TEE host process to receive the request from the client process to open a session, wherein the request includes an identifier of the TA, to signal to the TEE host process to load the TA enclave associated with the identifier and to establish the session using a GP Trusted Services enclave included in the TEE host process, to signal to the TEE host process to receive commands to be invoked in the TA enclave and a set of parameters needed for the commands, wherein the commands and the set of parameters are from the client process, to signal to the TA enclave associated with the identifier to execute the commands using GP Internal APIs; and a security processor coupled to the AES process via a secure channel.

Example 17 includes the subject matter of Example 16, wherein a first Inter-process communication (IPC) channel is established between the client process and the TEE host process, and a second IPC channel is established between the TEE host process and the AES process.

Example 18 includes the subject matter of Example 17, wherein the processor to signal to the TA enclave associated with the identifier to execute the commands using GP Internal APIs, further comprises: to signal to a GP trusted Run Time System (RTS) and native trusted RTS to implement the GP Internal APIs, wherein the GP trusted RTS and the native trusted RTS are included in the TA enclave.

Example 19 includes the subject matter of Example 17, wherein the processor to signal to the TA enclave associated with the identifier to execute the commands using GP Internal APIs, further comprises: establishing the second IPC channel between the TEE host process to one of the AEs included in the AES process; transmitting a request including at least one of the commands to the one of the AEs; and establishing the secure channel between the one of the AEs with the security processor.

Example 20 includes the subject matter of Example 17, wherein the TEE host process includes the TEE, wherein the TEE includes a plurality of TA enclaves including the TA enclave associated with the identifier and the GP Trusted Services enclave.

Example 21 includes the subject matter of Example 17, wherein the processor further to signal to an operating system (OS) services component included in the TEE host process to queue the commands, to signal to the GP Trusted Services enclave to validate the parameters, and to signal to the OS services component to dispatch the commands in sequence.

Example 22 includes the subject matter of Example 17, wherein the processor further to transmit a request from the client process to the GP Trusted Services enclave to close the session when execution of commands is completed, and to signal to the GP Trusted services enclave to process information related to the session and to unload the TA enclave associated with the identifier.

Some embodiments pertain to Example 23 that pertains to a method of providing a Global Platform (GP) compliant Trusted Execution Environment (TEE) comprising: executing an application stored in a memory device, the application including a client application (CA) and a trusted application (TA), wherein executing the application includes running the CA in a client process and the TA in a TEE host process, the client process and the TEE host process being separate; receiving using the TEE host process a request from the client process to open a session, wherein the request includes an identifier of the TA; determining a TA enclave associated with the identifier using a GP Trusted Services enclave that is included in the TEE host process; loading in the TEE host process the TA enclave associated with the identifier to establish the session using the GP Trusted Services enclave; receiving using the TEE host process commands to be invoked in the TA enclave and a set of parameters needed for the commands, wherein the commands and the set of parameters are from the client process; and executing the commands in the TA enclave associated with the identifier using GP Internal APIs.

Example 24 includes the subject matter of Example 23, wherein executing the commands in the TA enclave associated with the identifier using GP Internal APIs further comprises: implementing the GP Internal APIs using a GP trusted Run Time System (RTS) and native trusted RTS included in the TA enclave.

Example 25 includes the subject matter of Example 23, further comprising: running an Architectural Enclave Services (AES) process that includes a plurality of Platform Services Enclaves (PSEs) that provide secure services, respectively, wherein the AES process is separate from the client process and the TEE host process.

Example 26 includes the subject matter of Example 25, wherein executing the commands in the TA enclave associated with the identifier using GP Internal APIs further comprises: establishing a secure channel between the TEE host process to one of the PSEs included in the AES process; transmitting a request including at least one of the commands to the one of the PSEs; and establishing a secure channel between the one of the PSEs with a security processor.

Example 27 includes the subject matter of Example 23, further comprising: initializing the TEE in the TEE host process using Client application programming interfaces (APIs) by the client process.

Example 28 includes the subject matter of Example 23, further comprising: queuing the commands using an operating system services component included in the TEE host process; validating the parameters using the GP Trusted Services enclave; and dispatching the commands in sequence to the TA enclave associated with the identifier.

Example 29 includes the subject matter of Example 23, further comprising: when execution of commands is completed, transmitting a request from the client process to the GP Trusted Services enclave to close the session; and processing information related to the session and unloading the TA enclave associated with the identifier using the GP Trusted Services enclave to close the session.

Example 30 includes the subject matter of Example 23, wherein the identifier of the TA is a Unique Universal Identifier (UUID).

Example 31 includes the subject matter of Example 23, wherein the request to open the session, process commands and the set of parameters are transmitted via an Inter-process communication (IPC) channel.

Example 32 includes the subject matter of Example 23, further comprising: when the TA enclave associated with the identifier is previously loaded, selecting using the GP Trusted Services Enclave the TA enclave associated with the identifier.

Example 33 includes the subject matter of Example 23, wherein the TEE host process includes the TEE, wherein the TEE includes a plurality of TA enclaves including the TA enclave associated with the identifier and the GP Trusted Services enclave.

Some embodiments pertain to Example 34 that pertains to a machine readable medium including code, when executed, to cause a machine to perform the method of any one of examples 12-15 and 23-33.

Some embodiments pertain to Example 35 that pertains to an apparatus comprising means to perform a method as recited in any preceding example.

Some embodiments pertain to Example 36 that pertains to machine-readable storage including machine-readable instructions, when executed, to implement a method or realize an apparatus as recited in any preceding example.

What is claimed is:

1. A non-transitory computer-readable storage medium having stored therein instructions that, when executed by a processor, causes the processor to perform a method of providing a Global Platform (GP) compliant Trusted Execution Environment (TEE) comprising:
   executing an application stored in a memory device, the application including a client application (CA) and a trusted application (TA), wherein executing the application includes running the CA in a client process and the TA in a TEE host process, the client process and the TEE host process being separate;
   receiving using the TEE host process a request from the client process to open a session, wherein the request includes an identifier of the TA;
   determining a TA enclave associated with the identifier using a GP Trusted Services enclave that is included in the TEE host process;
   loading in the TEE host process the TA enclave associated with the identifier to establish the session using the GP Trusted Services enclave;
   receiving using the TEE host process commands to be invoked in the TA enclave and a set of parameters needed for the commands, wherein the commands and the set of parameters are from the client process; and
   executing the commands in the TA enclave associated with the identifier using GP Internal APIs.

2. The non-transitory computer-readable storage medium in claim 1, wherein executing the commands in the TA enclave associated with the identifier using GP Internal APIs further comprises:
   implementing the GP Internal APIs using a GP trusted Run Time System (RTS) and native trusted RTS included in the TA enclave.

3. The non-transitory computer-readable storage medium in claim 1, having stored therein instructions that, when executed by the processor, causes the processor to perform the method further comprising:
   running an Architectural Enclave Services (AES) process that includes a plurality of Architectural Enclaves (AEs) that provide secure services, respectively, wherein the AES process is separate from the client process and the TEE host process.

4. The non-transitory computer-readable storage medium in claim 3, wherein executing the commands in the TA enclave associated with the identifier using GP Internal APIs further comprises:
   establishing a secure channel between the TEE host process to one of the AEs included in the AES process;
   transmitting a request including at least one of the commands to the one of the AEs; and
   establishing a secure channel between the one of the AEs with a security processor.

5. The non-transitory computer-readable storage medium in claim 1, having stored therein instructions that, when executed by the processor, causes the processor to perform the method further comprising:
   initializing the TEE in the TEE host process using Client application programming interfaces (APIs) by the client process.

6. The non-transitory computer-readable storage medium in claim 1, having stored therein instructions that, when executed by the processor, causes the processor to perform the method further comprising:
   queuing the commands using an operating system services component included in the TEE host process;
   validating the parameters using the GP Trusted Services enclave; and
   dispatching the commands in sequence to the TA enclave associated with the identifier.

7. The non-transitory computer-readable storage medium in claim 1, having stored therein instructions that, when executed by the processor, causes the processor to perform the method further comprising:
   when execution of commands is completed, transmitting a request from the client process to the GP Trusted Services enclave to close the session; and
   processing information related to the session and unloading the TA enclave associated with the identifier using the GP Trusted Services enclave to close the session.

8. The non-transitory computer-readable storage medium in claim 1, wherein the identifier of the TA is a Unique Universal Identifier (UUID).

9. The non-transitory computer-readable storage medium in claim 1, wherein the request to open the session, process commands and the set of parameters are transmitted via an Inter-process communication (IPC) channel.

10. The non-transitory computer-readable storage medium in claim 1, having stored therein instructions that, when executed by the processor, causes the processor to perform the method further comprising:
    when the TA enclave associated with the identifier is previously loaded, selecting using the GP Trusted Services Enclave the TA enclave associated with the identifier.

11. The non-transitory computer-readable storage medium in claim 1, wherein the TEE host process includes the TEE, wherein the TEE includes a plurality of TA enclaves including the TA enclave associated with the identifier and the GP Trusted Services enclave.

12. A method of providing a Global Platform (GP) compliant Trusted Execution Environment (TEE) comprising:
    executing by a processor an application stored in a memory device, the application including a client application (CA) and a trusted application (TA), wherein executing the application includes running the CA in a client process and the TA in a TEE host process, the client process and the TEE host process being separate;

receiving by the processor using the TEE host process a request from the client process to open a session, wherein the request includes an identifier of the TA;

determining by the processor a TA enclave associated with the identifier using a GP Trusted Services enclave that is included in the TEE host process;

loading by the processor in the TEE host process the TA enclave associated with the identifier to establish the session using the GP Trusted Services enclave;

receiving by the processor using the TEE host process commands to be invoked in the TA enclave and a set of parameters needed for the commands, wherein the commands and the set of parameters are from the client process;

validating by the processor the parameters using the GP Trusted Services enclave;

dispatching by the processor the commands in sequence to the TA enclave associated with the identifier;

executing by the processor the commands in the TA enclave associated with the identifier using GP Internal APIs; and processing by the processor information related to the session and unloading the TA enclave associated with the identifier using the GP Trusted Services enclave to close the session.

13. The method of claim 12, wherein executing by the processor the commands in the TA enclave associated with the identifier using GP Internal APIs further comprises:

implementing the GP Internal APIs using a GP trusted Run Time System (RTS) and native trusted RTS included in the TA enclave.

14. The method of claim 12, further comprising:

running by the processor an Architectural Enclave Services (AES) process that includes a plurality of Architectural Enclaves (AEs) that provide secure services, respectively, wherein the AES process is separate from the client process and the TEE host process.

15. The method of claim 14, wherein executing the commands in the TA enclave associated with the identifier using GP Internal APIs further comprises:

establishing a secure channel between the TEE host process to one of the AEs included in the AES process;

transmitting a request including at least one of the commands to the one of the AEs; and establishing a secure channel between the one of the AEs with a security processor.

16. A system providing a Global Platform (GP) compliant Trusted Execution Environment (TEE) comprising:

a memory device to store an application, the application including a client application (CA) and a trusted application (TA);

a processor coupled to the memory device to execute the application by running the CA in a client process and the TA in a TEE host process, to run an Architectural Enclave Services (AES) process that includes a plurality of Architectural Enclaves (AEs) that provide secure services, respectively, wherein the client process, the TEE host process, and the AES process are separate, to signal to the TEE host process to receive the request from the client process to open a session, wherein the request includes an identifier of the TA, to signal to the TEE host process to load the TA enclave associated with the identifier and to establish the session using a GP Trusted Services enclave included in the TEE host process, to signal to the TEE host process to receive commands to be invoked in the TA enclave and a set of parameters needed for the commands, wherein the commands and the set of parameters are from the client process, to signal to the TA enclave associated with the identifier to execute the commands using GP Internal APIs; and a security processor coupled to the AES process via a secure channel.

17. The system of claim 16, wherein a first Inter-process communication (IPC) channel is established between the client process and the TEE host process, and a second IPC channel is established between the TEE host process and the AES process.

18. The system of claim 17, wherein the processor to signal to the TA enclave associated with the identifier to execute the commands using GP Internal APIs, further comprises:

to signal to a GP trusted Run Time System (RTS) and native trusted RTS to implement the GP Internal APIs, wherein the GP trusted RTS and the native trusted RTS are included in the TA enclave.

19. The system of claim 17, wherein the processor to signal to the TA enclave associated with the identifier to execute the commands using GP Internal APIs, further comprises:

establishing the second IPC channel between the TEE host process to one of the AEs included in the AES process;

transmitting a request including at least one of the commands to the one of the AEs; and establishing the secure channel between the one of the AEs with the security processor.

20. The system in claim 17, wherein the TEE host process includes the TEE, wherein the TEE includes a plurality of TA enclaves including the TA enclave associated with the identifier and the GP Trusted Services enclave.

21. The system of claim 17, wherein the processor further to signal to an operating system (OS) services component included in the TEE host process to queue the commands, to signal to the GP Trusted Services enclave to validate the parameters, and to signal to the OS services component to dispatch the commands in sequence.

22. The system of claim 17, wherein the processor further to transmit a request from the client process to the GP Trusted Services enclave to close the session when execution of commands is completed, and to signal to the GP Trusted services enclave to process information related to the session and to unload the TA enclave associated with the identifier.

* * * * *